May 18, 1954 M. F. SPEARS 2,678,972

STEPPED MAGNETIC RECORDING HEAD

Filed July 14, 1952

INVENTOR:
MORTON F. SPEARS

BY

Curtis, Morris & Safford
ATTORNEYS:

Patented May 18, 1954

2,678,972

UNITED STATES PATENT OFFICE 2,678,972

STEPPED MAGNETIC RECORDING HEAD

Morton F. Spears, Westwood, Mass., assignor to Dictaphone Corporation, Bridgeport, Conn.

Application July 14, 1952, Serial No. 298,668

7 Claims. (Cl. 179—100.2)

This invention relates to translating heads for use in magnetic sound or signal recording-reproducing systems and more particularly to translating heads for use with magnetic record mediums having stepped or overlapping portions therein. A dictating machine using such an overlapped record medium and adapted to use a translating head in accordance with the present invention is described in copending application, Serial No. 767,210, filed on August 7, 1947, Frederick W. Roberts et al., and assigned to the same assignee as the present invention.

In magnetic recording systems the translating head generally must be in contact with the magnetic record medium in order to function. Thus in systems wherein there is an overlapping of the record medium there will be an interval, as the overlap passes under the translating head, during which no signal can be recorded or picked up and during which, in systems heretofore known, whole syllables and even words were lost. This is particularly true in the so-called "slow speed" systems.

According to the present invention this interval is substantially eliminated by providing a recessed trailing pole piece in the translating head that will accommodate the overlap or stepped portion and permit the head to remain in contact with the record medium substantially throughout the entire surface thereof.

It is therefore a primary object of the present invention to provide a translating head that will substantially reduce the interval it is out of contact with the record medium.

It is another object to provide a translating head of a configuration such that it will remain in contact with stepped type record mediums throughout substantially the entire surface thereof.

It is a still further object to provide a translating head, of a novel configuration not heretofore known, for use in magnetic recording and reproducing systems.

These and other and further objects will be in part apparent and in part pointed out as the specification proceeds.

Figure 1:
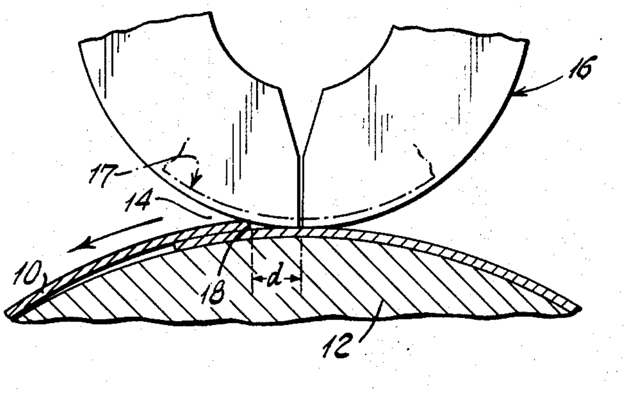
Figure 1 is an enlarged partial sectional view taken next to the pole pieces of a conventional translating head just after the stepped lap has passed under it and it again made contact with the record medium.

In Figure 1, the record medium 10 is a layer of magnetic material on a backing of paper or the like as is well known in the art. The record 10, which in the present embodiment is a generally rectangular sheet, is wrapped around a drum 12 (such as is shown in the above-mentioned application and a portion only of which is shown here) and overlapped at 14. This overlap is of sufficient length to compensate for any expansion or contraction of the record and drum due to varying ambient temperatures, humidity, etc. The conventional type of head heretofore known is indicated at 16 and has a record contacting surface of a generally smooth and continuous configuration of approximately circular or inverted U-shaped form. (Dotted line 17 shows the position of the head immediately before the lapped step started to move under it.)

In Figure 1 it is readily apparent that as the record moves past the conventional head there will be an interval "*d*" during which the translating head 16 is out of contact with the record medium while it rides down the edge 18 of the step caused by the overlap. As is well known in the art there can be no recording or reproducing during this interval which varies in duration depending upon the thickness of the record medium, the speed of rotation thereof, and the shape of the head. With this construction, syllables and even whole words may be lost in this interval. In dictating machines, to which this invention is particularly applicable, the loss of a syllable may change the entire meaning of the phrase. Obviously great accuracy in reproduction is essential, making any gap as "*d*" highly undesirable.

Figure 2:
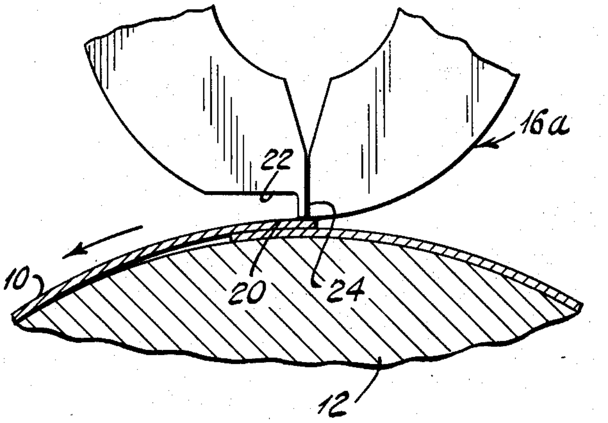
Figure 2 is a view similar to Figure 1, showing a translating head according to the present invention just before the stepped lap has passed under it.
Figure 3:
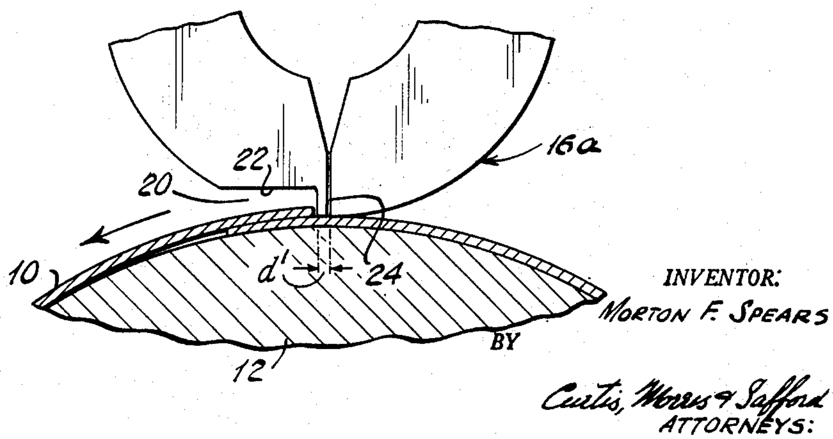
Figure 3 is a view similar to Figure 2, showing the head just after the stepped lap has passed under it.

As may be seen from Figures 2 and 3 according to the present invention the interval "*d*" is eliminated for all practical purposes, being reduced to the very small distance "*d'*." This elimination of the gap "*d*" is accomplished by providing a recess 20 in the trailing edge of the trailing pole piece of the head **16*a* of a configuration generally corresponding to the stepped overlap. This recess is of a depth greater than the thickness of any of the various types of records that may be used, so that its upper surface 22 can never approach too near the record. The front wall of the recess is adjacent the magnetic gap 24** of the head but is spaced therefrom a sufficient distance to provide for the necessary flux density for proper recording and reproducing.

Thus as the record medium passes under the translating head the head rides on the surface of the record in the conventional manner but upon reaching the step of the overlap it almost immediately drops down onto the underlying portion, the recess accommodating the overlap, so that any lost intelligence is negligible.

The above embodiment has been described as applying to a drum type record support with an overlapped record medium. Obviously the present invention applies equally to other types of lapped record medium systems such as the well known magnetic tape spliced by overlapping; overlapped magnetic belts supported on a series of rollers or between two pins, etc.

While there is given above a certain specific example of this invention and its application in practical use, it should be understood that it is not intended to be exhaustive or to be limiting of the invention. On the contrary, this illustration and the explanation herein is given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

I claim:

1. In a magnetic signal recording-reproducing system of the type wherein the record medium has overlapping end portions and the recording head has a pair of pole pieces of a generally smooth configuration oriented in leading and trailing relationship with respect to the direction of travel of the record medium and adapted to contact and ride upon the record medium, that improvement which comprises a recess in the trailing pole piece of the head of a depth greater than the thickness of the recording medium and beginning closely adjacent but spaced from the air gap of said pole face system.

2. For use in a signal recording-reproducing system of the magnetic type having a magnetic recording medium with overlapping portions, a translating head adapted for relative movement in relation to the record medium in intimate surface contact therewith which comprises a pair of pole pieces juxtaposed about a magnetic gap so as to form a smooth record contacting surface, and a recess in one of said pole pieces commencing adjacent but spaced from said gap and extending away from said gap at a depth from said record medium substantially greater than the thickness of the recording medium.

3. In a translating head for use in a magnetic type signal recording-reproducing system having a record medium with overlapped end portions, a pair of pole pieces disposed about a magnetic gap to form an inverted U-shaped pole face assembly adapted for sliding contact with the record medium and a recessed portion in the pole piece at the trailing edge of said pole face assembly, with reference to the direction of movement of the record medium, said stepped portion being of a depth at least as great as the thickness of said record medium.

4. In a signal recording reproducing system of the type wherein the orientation of the residual magnetic field in the record medium is varied in accordance with the signal recorded, the combination of a magnetic recording medium having therein a step formed by overlapping end portions, a translating head for translating the signals to be recorded into magnetic variations in accordance therewith, including a pair of pole pieces disposed about a gap, an energizing winding for said pole pieces and a recess in the trailing edge pole piece of a complementary configuration to the step in the record medium whereby the distance the recording head is out of contact with the record medium as it traverses said step is substantially reduced.

5. In a signal recording-reproducing system of the type wherein the orientation of the residual magnetic field of the record medium is varied in accordance with the signal to be recorded, the combination of a record medium comprising a generally rectangular sheet having a magnetic coating thereon and having the edge portions thereof overlapped to form a step in the record medium, a translating head for changing the signal to be recorded into magnetic field variations in accordance therewith, comprising a pair of thin pole pieces disposed about a magnetic gap, an energizing coil mounted about said pole pieces and an L-shaped recess in the trailing edge of the trailing pole piece adapted to receive the step formed in the record medium whereby said recording head is out of contact with the record medium a substantially reduced period of time.

6. In a signal recording reproducing system of the magnetic type having a magnetic recording medium with overlapping end portions, a translating head adapted for movement relative to said record medium in intimate contact with the surface thereof, which comprises a pair of pole pieces juxtaposed about a magnetic gap to form a record contacting surface, the trailing pole piece of said pair having a relieved area in the trailing edge thereof disposed transversely of the direction of movement relative to the record medium whereby the distance the translating head is held out of contact with the record medium as it traverses said overlapped end portions is substantially reduced.

7. For use in signal recording-reproducing systems of the magnetic type having a magnetic recording medium with overlapping end portions, a translating head adapted for relative movement in relation to the record medium in intimate surface contact therewith which comprises, a pair of pole pieces juxtaposed about a gap having a relatively greater reluctance than said pole pieces so as to form a smooth record-contacting surface, the trailing pole piece of said pair having a relatively narrow record-contacting surface disposed transversely of the direction of movement relative to the record medium, and having a cross-sectional area parallel to its record-contacting surface approximately equal to the area of said surface at least for a distance therefrom in the order of magnitude of the thickness of said record medium, whereby said translating head is held out of contact with said record medium a substantially reduced period of time as said head passes over the overlapping end portion of said recording medium.

References Cited in the file of this patent

UNITED STATES PATENTS

| Number | Name | Date |
|---|---|---|
| 2,536,030 | Camras | Jan. 2, 1951 |